(No Model.)
K. P. JOHNSON.
STOCK WATERER.
No. 591,276.  Patented Oct. 5, 1897.
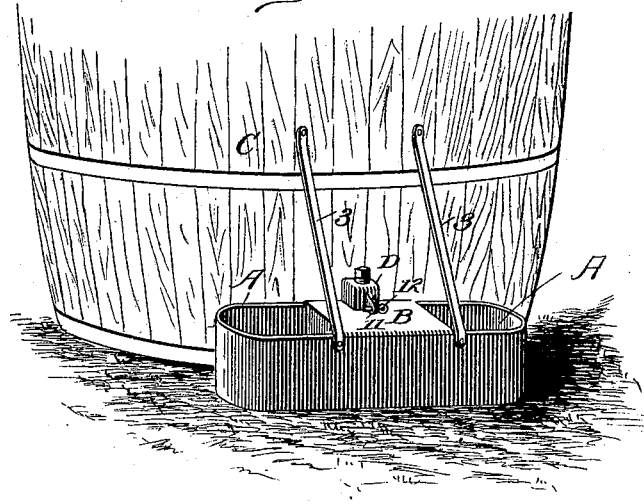
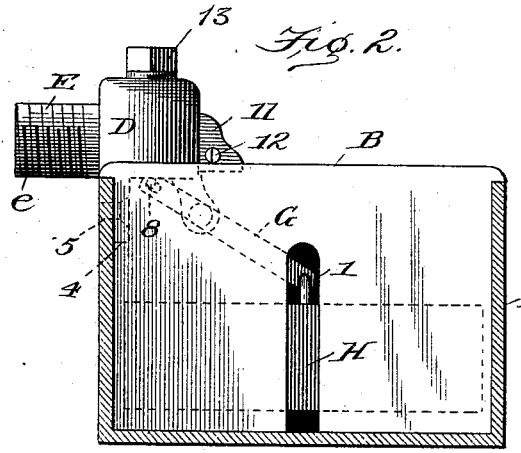
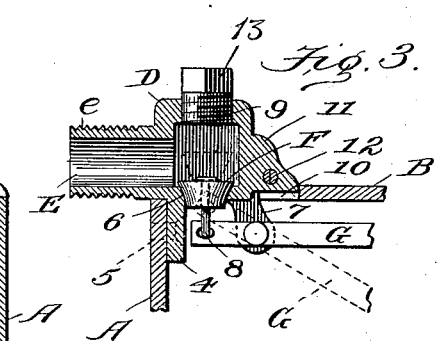
WITNESSES:
Edwin L. Bradford
E. Wade Ball
INVENTOR
Kimber P. Johnson
BY R. Smith Lacey
ATTORNEY.

UNITED STATES PATENT OFFICE.

KIMBER P. JOHNSON, OF HARLAN, IOWA.

STOCK-WATERER.

SPECIFICATION forming part of Letters Patent No. 591,276, dated October 5, 1897.

Application filed June 20, 1896. Serial No. 596,354. (No model.)

*To all whom it may concern:*

Be it known that I, KIMBER P. JOHNSON, of Harlan, in the county of Shelby and State of Iowa, have invented an Improved Stock-Waterer, of which the following is a specification.

The present invention relates to a device for watering stock, and has for its object the provision of a device which will automatically supply water in a trough suitably placed.

The device may be fastened to any tank, barrel, pipe, or almost anything holding water, and it automatically supplies water in a trough, said trough being so subdivided as to form two drinking-cups and also containing a float-apartment. As the water in the barrel flows into and fills the trough with the proper quantity of water a float properly connected with a valve rises and closes the valve, shutting off the flow of water until some animal drinks some of the water, when the float sinks, opens the valve, and keeps it open until the trough is again properly filled.

With these objects in view the invention consists of the details of arrangement and construction, which will more fully appear hereinafter.

In the accompanying drawings, which form a part of this application, Figure 1 is a perspective view of my invention. Fig. 2 is a side elevation of the valve-casing. Fig. 3 is a longitudinal sectional view of the valve-casing, showing in full lines the valve in its normal position when the trough is full and in dotted lines the position of the valve when the water in the said trough is low.

Like letters and figures of reference indicate corresponding parts in the several views.

Referring to the drawings, in the practical embodiment of my invention I employ a tank or trough A, which may be of any size, shape, or material, and a float-apartment B, within which is situated the float mechanism, which will be more fully described hereinafter.

C represents a reservoir, in the present instance a barrel, said reservoir containing the water-supply. The outer casing D, containing the valve mechanism, is fastened to the said barrel by means of the pipe E, said pipe E having the exterior threads e situated in the bung-hole of the above-mentioned barrel.

The pipe E is cast integrally with the casing D and serves as a passage for the water from the reservoir. For further securing the tank to the barrel braces 3 are attached to the tank and barrel as shown. The casing D has a downwardly-projecting flange 4, through which pass bolts 5, said bolts being secured to the side of trough or tank A, thus connecting the valve-casing to the trough.

A valve F is situated in the casing D and is drawn down by means which will be more fully described hereinafter, and fits into the opening 6, thus cutting off the flow of water. A lever G is pivoted to the downwardly-projecting lug 7, and is pivoted at one to the float H and at the other end to the downwardly-projecting end of the said valve by means of the screw-eye 8.

An opening 9 is situated in the top of the casing D, a screw-plug 13 being provided to close said opening, the said opening allowing the insertion of the valve F, also allowing the interior of the casing to be cleaned. The outer casing D fits into the opening 10 in the float-apartment B. A shoulder 11 is secured to the casing D, and has a spring-linchpin 12 inserted therethrough, the purpose of which is to secure the cover over the float-chamber.

Having thus described my invention, what I claim as new, and desire to secure by Letters Patent, is—

A stock-waterer, comprising the oblong trough A, the float-chamber B located midway the length thereof in combination with a socket D having the integral threaded nipple E and depending ear 7, the lever G fulcrumed in said depending ear 7, its shorter end in operative connection with the valve F, an opening 9 in the top of said socket D through which to insert said valve in its seat, a screw-plug 13 for closing said opening 9, a float H in operative connection with the longer end of said lever G, the said lever adapted to operate transversely of said trough A, a lug 11 formed integral with said socket D, receiving a key 12, for removably securing a cover over said float-chamber B, substantially as set forth and described.

In testimony whereof I affix my signature in the presence of two witnesses.

KIMBER P. JOHNSON.

Witnesses:
MADS. THOMPSON.
OLE HANSEN.